O. ZIMMERMANN.
WRENCH.
APPLICATION FILED SEPT. 2, 1909.
968,106.
Patented Aug. 23, 1910.
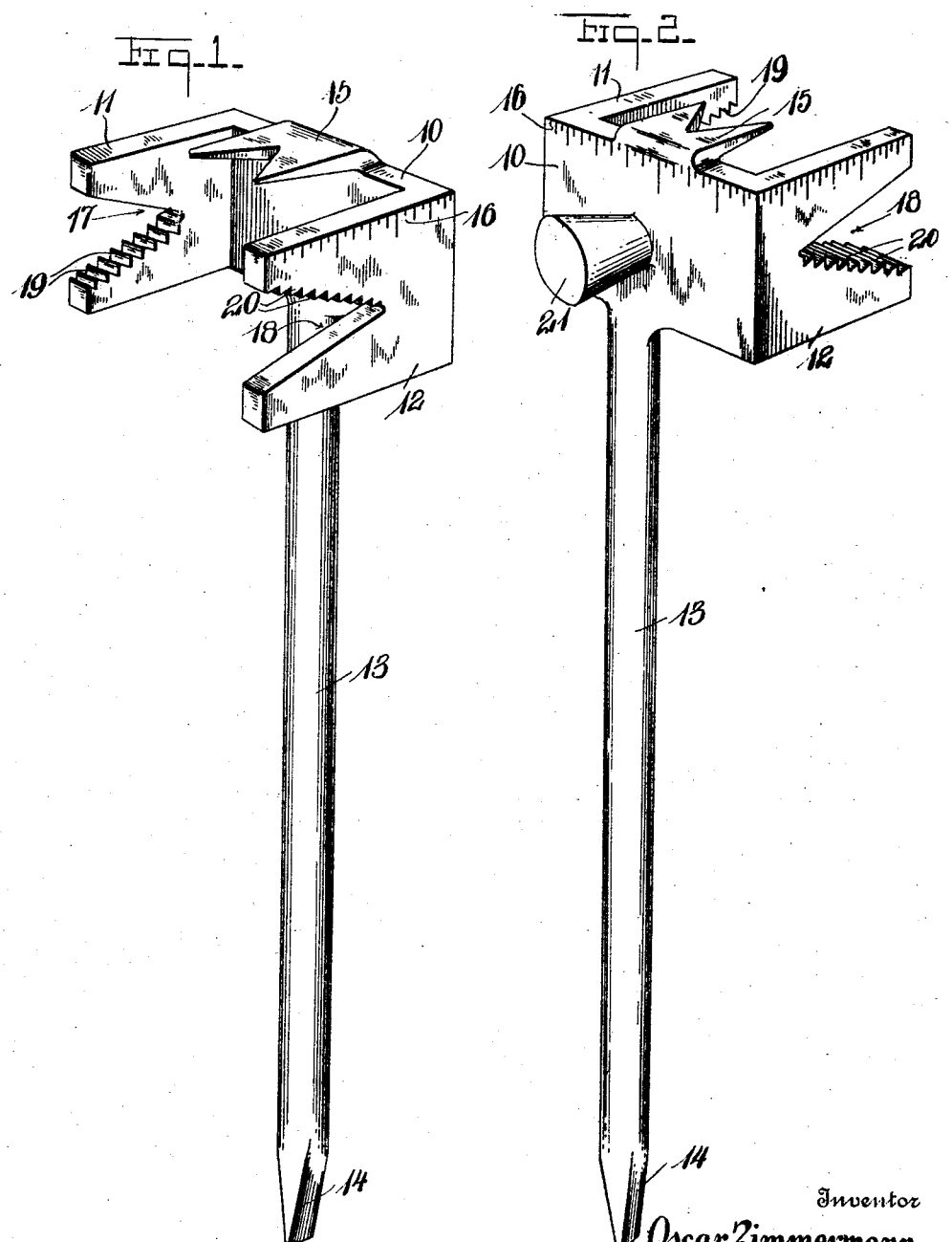

UNITED STATES PATENT OFFICE.

OSCAR ZIMMERMANN, OF ST. HELEN, OREGON.

WRENCH.

968,106.  Specification of Letters Patent.  Patented Aug. 23, 1910.

Application filed September 2, 1909. Serial No. 515,760.

*To all whom it may concern:*

Be it known that I, OSCAR ZIMMERMANN, a citizen of the United States, residing at St. Helen, in the county of Columbia, State of Oregon, have invented certain new and useful Improvements in Wrenches; and I do hereby declare the following to be a full, clear, and exact description of the invention, such as will enable others skilled in the art to which it appertains to make and use the same.

This invention relates to wrenches, and has for its object to improve the construction and increase the efficiency and utility of devices of this character.

With this and other objects in view, the invention consists in certain novel features of construction, as hereafter shown and described, and then specifically pointed out in the claim, and in the drawings illustrative of the preferred embodiment of the invention, Figure 1 is a perspective view of the improved implement viewed from one side. Fig. 2 is a perspective view of the improved implement viewed from the opposite side.

The improved device comprises a head member formed with a base portion 10 and spaced sides 11—12, the sides extending at right angles to the base. Extending from the base portion 10 is a shank 13 terminating at its free end in a screw driver 14. The three members 10—11—12 constitute a wrench head, adapted to bear over a relatively large nut, for instance the hub holding nuts of vehicle wheels. Formed upon the outer edge of the base member 10 is a tack pulling claw 15, and formed upon the outer faces of the members 10—11—12 are graduations 16 denoting inches and fractions of inches. Formed in the member 11 is a V-shaped recess or cavity 17, and likewise formed in the side member 12 is a similar V-shaped recess or cavity 18, the two cavities being thus arranged in alinement transversely of the head. One of the side walls of the recess 17 is provided with rod or pipe engaging teeth 19, and one of the side walls of the recess 18 is provided with similar teeth 20, the teeth 20 being arranged upon the opposite wall of the recess from that upon which the teeth 19 are located. By this simple means a convenient and useful implement is produced which may be employed for a variety of purposes. The members 10—11—12 as before stated constitute a convenient wrench head for handling relatively large nuts. Either of the recesses 17—18 may be employed for operating relatively small nuts, while the claw 15 may be employed in drawing tacks or small nails. The graduations 16 and the screw driver are also convenient adjuncts to the implement, as will be obvious. Extending from the rear face of the base member 10 is an enlargement 21 forming an efficient hammer member.

The transversely alined recesses 17—18 with their rod engaging teeth 19—20 oppositely arranged, as before described, constitute an important and efficient feature of the improved implement, as these recesses coact to produce an efficient pipe or rod wrench, which may be employed to rotate a pipe or rod in either direction. When the pipe or rod is to be rotated in one direction, the teeth 19 coacting with the opposite smooth face of the recess 17 grip the rod, while the recess 18 serves to guide and support the rod and prevent lateral movement of the implement upon the rod. If the pipe or rod is to be rotated in the opposite direction the teeth 20 of the recess 18 grip the rod while the recess 17 serves as the guide for the rod or pipe. The teeth 19—20 are formed with one face of each inclined and the inclines of one set of the teeth are reverse to that of the other set, so that when the pipe or rod is rotated in one direction the teeth 19 grip the pipe, while the teeth 20 simply slip over the pipe, and when the pipe or rod is rotated in the opposite direction, the teeth 20 grip the pipe while the teeth 19 simply slip over the pipe or rod. With an implement thus constructed it will be obvious that a pipe or rod may be rotated in either direction without detaching the implement or reversing the position, thus effecting a material saving in time and labor.

The improved implement is simple in construction, can be cast from steel at one operation and without employing cores. The implement may also be drop forged if preferred.

What is claimed is:—

An implement of the class described comprising a head including two members spaced apart with their confronting faces arranged in parallel relations, each of said members having a V-shaped recess in one end, one wall of each recess being provided with pipe engaging teeth with the teeth of one of the recesses arranged reversely to the teeth of the other recess, whereby the implement is capable of rotating a pipe or rod in either direction.

In testimony whereof, I affix my signature, in presence of two witnesses.

OSCAR ZIMMERMANN.

Witnesses:
E. E. QUICK,
F. B. PRESCOTT.